(12) United States Patent
Kim

(10) Patent No.: US 7,609,357 B2
(45) Date of Patent: Oct. 27, 2009

(54) LIQUID CRYSTAL PANEL HAVING DUAL COLUMN SPACER AND MANUFACTURING METHOD THEREOF

(75) Inventor: Pyung Hun Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 405 days.

(21) Appl. No.: 11/475,927

(22) Filed: Jun. 28, 2006

(65) Prior Publication Data

US 2007/0002264 A1    Jan. 4, 2007

(30) Foreign Application Priority Data

Jun. 30, 2005    (KR)    ............. 10-2005-0058863

(51) Int. Cl.
*G02F 1/1339*    (2006.01)
(52) U.S. Cl. .................. 349/156; 349/155; 349/157
(58) Field of Classification Search .......... 349/155–157
See application file for complete search history.

(56) References Cited

U.S. PATENT DOCUMENTS 7,423,717 B2 *    9/2008    Kadotani ............... 349/155

| | | | |
|---|---|---|---|
| 2004/0189928 A1 | 9/2004 | Yang et al. | |
| 2004/0223109 A1 | 11/2004 | Taniguchi et al. | |
| 2005/0088606 A1 | 4/2005 | Ashizawa et al. | |
| 2006/0285060 A1* | 12/2006 | Misaki et al. | 349/156 |
| 2007/0002265 A1* | 1/2007 | Kwak et al. | 349/156 |

* cited by examiner

*Primary Examiner*—Hemang Sanghavi
(74) *Attorney, Agent, or Firm*—McKenna Long & Aldridge LLP

(57) ABSTRACT

Disclosed is a liquid crystal panel having a dual column spacer and a manufacturing method thereof. The liquid crystal panel includes a first substrate on which a polished organic insulation film is formed on the entire surface of a pixel region including a TFT. The first substrate includes a contact hole formed through the organic insulation film; a second substrate disposed opposite to the first substrate and having a black matrix and a color filter; a first column spacer formed on the second substrate to contact the first substrate to maintain a gap between the first substrate and the second substrate; and a second column spacer formed on the second substrate on an area of the second substrate corresponding to the contact hole on the first substrate. The second column spacer is separated from the first substrate by a predetermined distance.

21 Claims, 7 Drawing Sheets

TFT  Pixel  C$_{st}$

TFT  Pixel  C$_{st}$

LIQUID CRYSTAL PANEL HAVING DUAL COLUMN SPACER AND MANUFACTURING METHOD THEREOF

This application claims the benefit of Korean Patent Application No. 2005-0058863, filed on Jun. 30, 2005, which is hereby incorporated by reference for all purposes as if fully set forth herein.

BACKGROUND OF THE INVENTION

1. Field of the Invention

The present invention generally relates to a liquid crystal display device, and mote particularly, to a liquid crystal panel having a dual column spacer structure and a manufacturing method thereof.

2. Discussion of Related Art

A liquid crystal display device displays images by employing the optical anisotropy and birefringence properties of liquid crystal molecules. A typical liquid crystal display device includes two opposing substrates each having electric field generating electrodes disposed on a surface facing the other substrate. A liquid crystal layer is formed between the two substrates. The orientation of liquid crystal molecules of the liquid crystal is then changed by means of an electric field generated by applying a voltage to the two electrodes. When the orientation of the liquid crystal molecules is changed by the electric field the transmission of light through the liquid crystal layer changes due to the optical anisotropy and birefringence properties of the liquid crystal. Accordingly, the amount of light that transmitted through the liquid crystal display device can be controlled to display a desired image. A liquid crystal display device typically includes a Thin Film Transistor (TFT) as a switching element of the liquid crystal display (LCD).

FIG. 1 is a perspective view schematically showing the construction of a liquid crystal display device of the related art. Referring to FIG. 1, the liquid crystal panel provided within the liquid crystal display device has a first substrate 10 and a second substrate 20, which are bonded together with a predetermined distance or gap therebetween, and a liquid crystal layer 30 formed between the first substrate 10 and the second substrate 20.

The first substrate 10 includes a plurality of gate lines 13 and a plurality of data lines 12 are arranged on a transparent glass substrate 11. The plurality of gate lines 13 are arranged to be substantially parallel to each other and separated by a predetermined distance. The plurality of data lines 12 are arranged substantially perpendicular to the gate lines 13. Pixel regions (Pixel) are defined by the crossings of the data lines 12 and gate lines 13.

Furthermore, a pixel electrode 14 is formed in each pixel region (Pixel). A TFT is formed at each crossing of a gate line 13 and a data line 12. The TFT applies a data signal of the data line 12 to each pixel electrode 14 according to a scan signal applied through the gate line 13.

The second substrate 20 includes black matrix layers 22 for shielding light from portions of the substrates other than the pixel regions (Pixel) formed on a second transparent glass substrate 21. R, G, and B color filter layers 23 for displaying colors are formed at portions corresponding to the pixel regions. A common electrode 24 for generating electric fields with the pixel electrode is formed on the color filter layers 23.

Charge capacitors $C_{ST}$ connected in parallel with each pixel electrode 14 are formed on gate lines 13. A portion of a gate line 13 is used the first electrode of a charge capacitor $C_{ST}$. Metal patterns of an island shape, which are formed using the same material as that of source and drain electrode, are used as second electrodes of the charge capacitors $C_{ST}$. A passivation layer may be formed over components on the first substrate including the TFT and the charge capacitors $C_{ST}$.

In the related art liquid crystal display device described above, molecules of the liquid crystal layer 30 disposed between the first substrate 10 and the second substrate 20 are oriented by means of an electric field between the pixel electrodes 14 and the common electrode 24. The amount of light that transmitted through the liquid crystal layers 30 changes with the orientation of the liquid crystal layer 30 to display a desired image.

A liquid crystal display device constructed as described above is called a Twisted Nematic (TN) mode LCD. The TN mode LCD is disadvantageous in that it has a narrow viewing angle. An In-Plane Switching (IPS) mode LCD has been developed to overcome the narrow viewing angle disadvantage of the TN mode.

In the IPS mode LCD, the pixel electrodes and the common electrode are formed in the pixel regions on the first substrate. The pixel electrodes are arranged parallel to the common electrode with a predetermined distance therebetween so that a horizontal electric field is generated between the pixel electrodes and the common electrode. The liquid crystal layer is oriented by the longitudinal electric field.

In the liquid crystal display devices described above, spacers (not shown in the drawings) for maintaining the gap between the two substrates are formed between the first substrate 10 (for example, an array substrate) and the second substrate 20 (for example, a color filter substrate). The spacers are classified into spacers of a spherical shape, which are disposed on a substrate using a dispersing method, and spacers of a column shape (column spacer), which are directly formed on the color filter substrate 10 and the array substrate 20.

A column spacer construction having a dual structure, referred to as a dual column spacer has been proposed. The dual column spacer includes a first column spacer and a second column spacer. The first column spacer serves to maintain the gap through contact with both the first substrate 10 and the second substrate 20. The second column spacer is separated from one of the first or second substrate 10 or 20 by a predetermined distance, and serves as a pressing spacer to preserve a marginal gap between the substrates when a surface of the liquid crystal device is moved by the spaced distance.

FIG. 2A is a cross-sectional view of the liquid crystal panel to which the dual column spacer structure of the related art is applied and FIG. 2B is a cross-sectional view of the liquid crystal panel having the thick organic insulation film.

Referring to FIGS. 1 and 2A, on the first substrate 10 are defined the TFT region (i.e., the switching region), the pixel region (Pixel), and the storage region $C_{ST}$.

A TFT having a gate electrode 41, an active layer 13a, a source electrode 12a, and a drain electrode 12b is formed in the TFT region. A transparent pixel electrode 14 is formed in the pixel region (Pixel).

The charge capacitor $C_{ST}$ is formed in the TFT region. The charge capacitor $C_{ST}$ uses the gate line 13b as the first electrode and is formed over the gate line 13b in an island shape. Furthermore, the charge capacitor $C_{ST}$ uses a metal pattern 12c contacting the pixel electrode 14 as the second electrode. The charge capacitor $C_{ST}$ may have a variety of structures and shapes. An insulating layer 42 is formed between the first and second electrodes of the charge capacitor $C_{ST}$.

The black matrix layers 22 are formed on one surface of the second substrate 20 in an area corresponding to the TFTs, and the gate lines 13 and the data lines 12 of the first substrate. The second substrate 20 is spaced apart from the first substrate 10 and a liquid crystal layer 30 is formed therebetween. The color filter layers 23 are formed on a portion of the surface of the second substrate 20 corresponding to the pixel regions (Pixel). A transparent common electrode 24 is formed on the entire surface of the second substrate 20 on which the color filter layers 23 and the black matrix layers 22 are formed. Orientation films (not shown) may be formed on the pixel electrodes 14 and the common electrode 24, respectively. A detailed description of the orientation films will be omitted.

First and second column spacers 50a and 50b are formed below the common. electrode 24 corresponding to the TFT and a portion of the pixel region (Pixel). The spacers may have a ball or column shape. FIG. 2A shows spacers 50a and 50b of a column shape. Column-shaped spacers have the advantage of having a relatively small adverse effect on the aperture ratio when compared with ball-shaped spacers.

The first and second column spacers 50a and 50b are uniformly distributed over the entire surface of the second substrate 20. The first column spacer 50a and the second column spacer 50b have the same length since first column spacer 50a and the second column spacer 50b are each fabricated using the same process. The first column spacer 50a serves as a gap spacer that maintains the gap between the two substrates 10 and 20. The second column spacer 50b is spaced apart from the first substrate 10 by a predetermined distance. The first column spacer 50a is positioned to contact a feature on the first substrate 10 having a step height above the first substrate 10.

Accordingly, the first column spacer 50a may be formed in an area corresponding to the TFT (i.e., an elevated portion) and accordingly directly serves to maintain the gap between the first substrate 10 and the second substrate 20. However, the second column spacer 50b is not formed in an area corresponding to an elevated portion such as the TFT, and may accordingly be separated from the first substrate 10 by a predetermined distance.

The second column spacer 50b is separated from one of the first substrate 10 and the second substrate 20 by a predetermined distance. Therefore, if the liquid crystal is excessively filled between the substrates, the liquid crystal may flow into the space between the second column spacer 50b and the first substrate 10. Accordingly, the second column spacer 50b can minimize the occurrence a gravity induced failure in which the liquid crystal flows downwardly out of the panel. The second column spacer 50b can also prevent pressing spots of the liquid crystal panel by serving as a force resistance component when pressure is applied to the liquid crystal panel. Furthermore, the second column spacer 50b functions to preserve or increase a minimum spacing between the first and second substrates 10 and 20 when forming the liquid crystal layer by injecting liquid crystal therebetween the first and second substrates 10 and 20.

The first and second substrates 10 and 20 are fabricated separately. After the first and second substrates 10 and 20 are fabricated separately, the substrates are bonded together to complete the liquid crystal panel.

A photo acryl pixel structure has recently been widely used to improve the aperture ratio of the liquid crystal panel. The photo acryl is employed in the form of a thick organic insulation layer.

Referring to FIG. 2B, a photo acryl layer 44' is formed as a relatively thick organic insulation layer on the completed lower substrate 10 and is then polished. However, it is difficult to use the photo acryl layer 44' with the dual column space structure of the related art. When the photo acryl layer 44' is formed on the first substrate 10, the second substrate 20 and the first substrate 10 having the first column spacer 50a and the second column spacer 50b; with the same height as described above cannot be bonded together because no elevated step height feature is formed on the first substrate 10. The first column spacer 50a indicated by reference numeral "A" can serve as the gap spacer without change even when the photo acryl layer 44' is formed, but the second column spacer 50b indicated by reference numeral "B" and having the same height as that of the first column spacer 50a cannot be separated from the first substrate 10 by a predetermined distance. Accordingly, the second column spacer 50b cannot serve as the pressing spacer.

SUMMARY OF THE INVENTION

Accordingly, the present invention is directed to a liquid crystal panel having dual column spacer and manufacturing method thereof that substantially obviates one or more of the problems due to limitations and disadvantages of the related art.

An advantage of the present invention is to provide a liquid crystal panel and a method of manufacture thereof, wherein the aperture ratio can be improved, and resistance to gravity failure, touch spots, pressing (or painting) failure of the liquid crystal panel can be improved by including advantages of the photo acryl pixel structure and the dual column spacer structure.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal panel includes a first substrate on which a polished organic insulation film is formed on the entire surface of a pixel region including a TFT, the first substrate including a contact hole formed through the organic insulation film; a second substrate disposed opposite to the first substrate and having a black matrix and a color filter formed thereon; a liquid crystal layer formed between the first substrate and the second substrate; a first column spacer formed on the second substrate to contact the first substrate to maintain a gap between the first substrate and the second substrate; and a second column spacer formed on the second substrate on an area of the second substrate corresponding to the contact hole on the first substrate the second column spacer formed to be separated from the first substrate by a predetermined distance.

In another aspect of the present invention a method of manufacturing a liquid crystal panel includes preparing a first substrate on which a TFT array is formed; preparing a second substrate on which a black matrix and a color filter array are formed; forming an organic insulation film on the first substrate and polishing the organic insulation film; forming a pixel electrode partially on the polished organic insulator film; forming a contact hole through the organic insulation film; forming a first column spacer on the first substrate to contact the second substrate to maintain a gap between the first substrate and the second substrate; forming a second column spacer on the second substrate on an area of the second substrate corresponding to the contact hole, wherein the second column spacer is separated by a predetermined distance from the first substrate; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

A liquid crystal display device having a large area may be fabricated using a liquid crystal dropping method that may provide process advantages such as a reduced process time. Furthermore, the liquid crystal display device may employ column spacers as a supporter between upper and lower substrates. The density of the column spacers is a factor in determining the probability of degree of failure in the panel. Failures types that may occur in large-area liquid crystal display devices may include gravity failure, touch spots, and pressing failure.

The term "gravity failure" refers to a phenomenon in which liquid crystal gathers together at a portion close to the surface when the liquid crystal display panel is positioned vertically and edge sides of the liquid crystal display panel close to the surface expand due to high temperature.

The term "touch spot" refers to a phenomenon in which when the liquid crystal panel surface is exposed to a shearing force such as from friction from a user's hands or from a pen. A touch spot occurs when the liquid crystal does not return to the initial position when the shearing force is removed, but remains dispersed at the touched portions. The displacement of liquid crystal from the touched portions creates a light source failure or black spot. The cause of the liquid crystal not returning to the initial position is a high friction force between the substrates due to the column spacers.

The term "pressing failure" refers to a phenomenon occurring when the column spacers are distributed between the upper and lower substrates at too low a density. Upon being pressed by a given force, in portions of a liquid crystal display device in which the column spacers are not formed, the cell gap between the upper and lower substrates is not restored, but remains collapsed even after the force is removed.

The above-described failures types are interrelated and may occur together.

In the liquid crystal panel and the manufacturing method thereof according to an embodiment of the present invention, a dual column spacer is formed on a color filter substrate corresponding to a TFT substrate on which a step height does not exist due to a thick organic insulation film covering the TFT substrate. The dual column spacer includes a pressing column spacer formed over a contact hole within a pixel, and a gap column spacer that maintains a cell gap. It is therefore possible to prevent a pressing failure (also known as painting failure) in which the cell gap is collapsed by external pressure.

Hereinafter, embodiments of the present invention will be described with reference to FIGS. 3 to 8.

Figure 1:
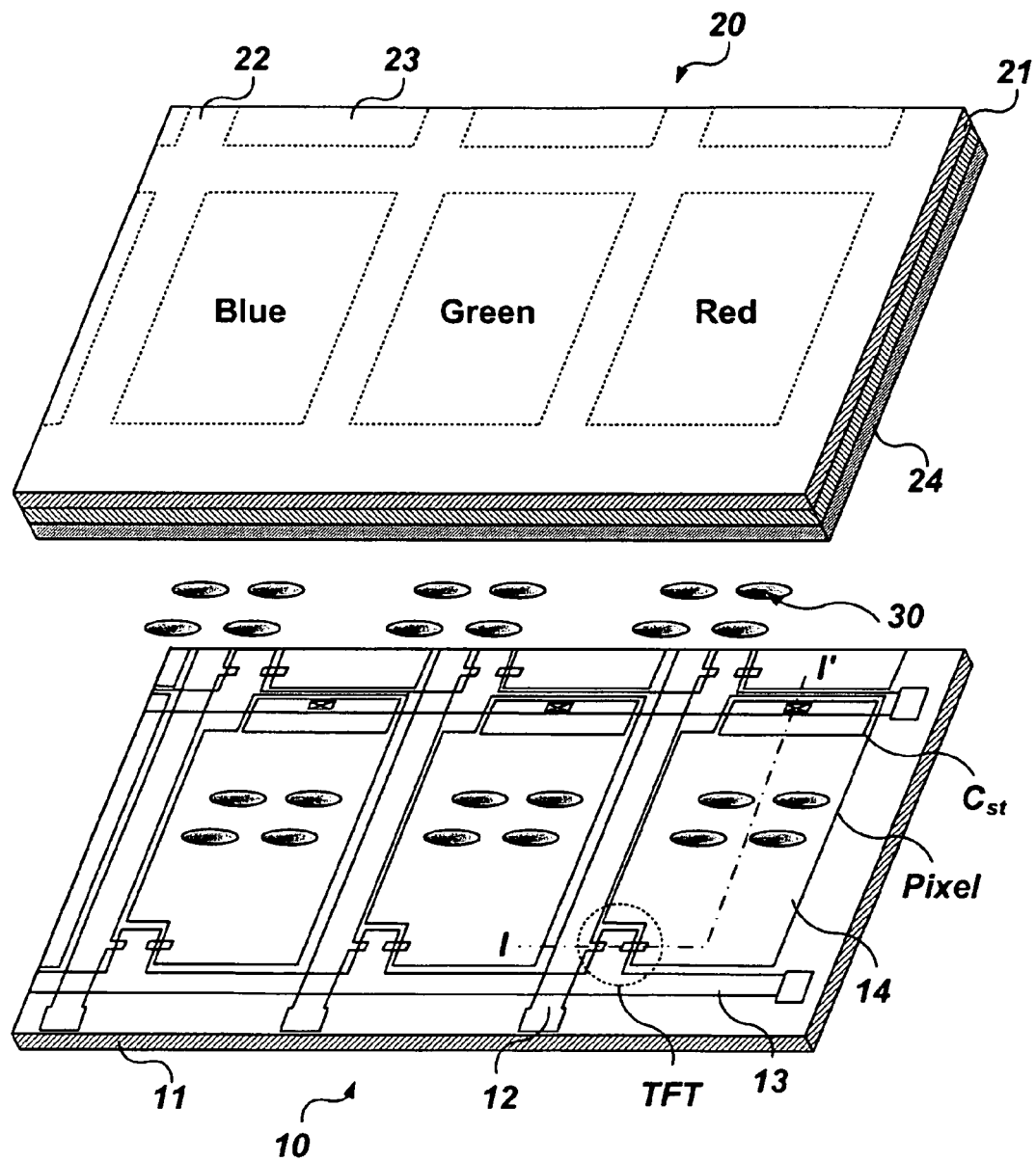
FIG. 1 is a perspective view schematically showing the construction of a general liquid crystal panel.
Figure 2A:
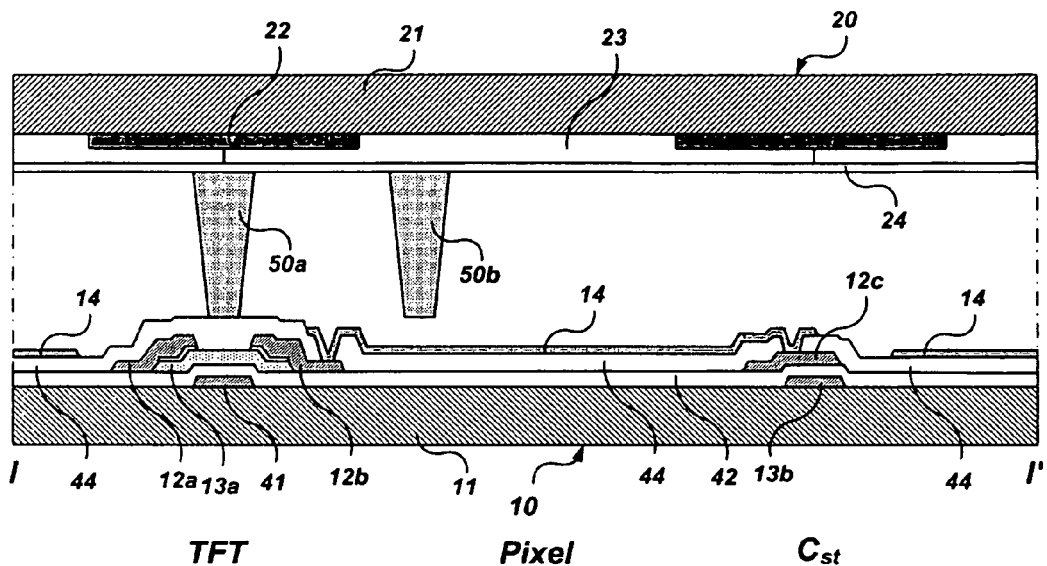
FIG. 2A is a cross-sectional view of the liquid crystal panel to which the dual column spacer structure is applied in the related art and FIG. 2B is a cross-sectional view of the liquid crystal panel having the thick organic insulation film.
Figure 2B:
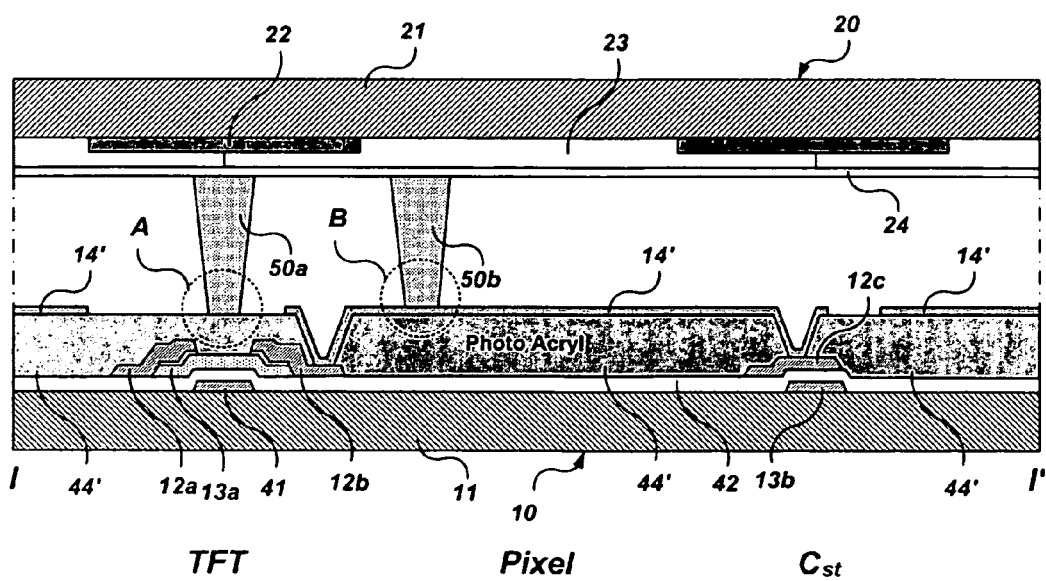
Figure 3:
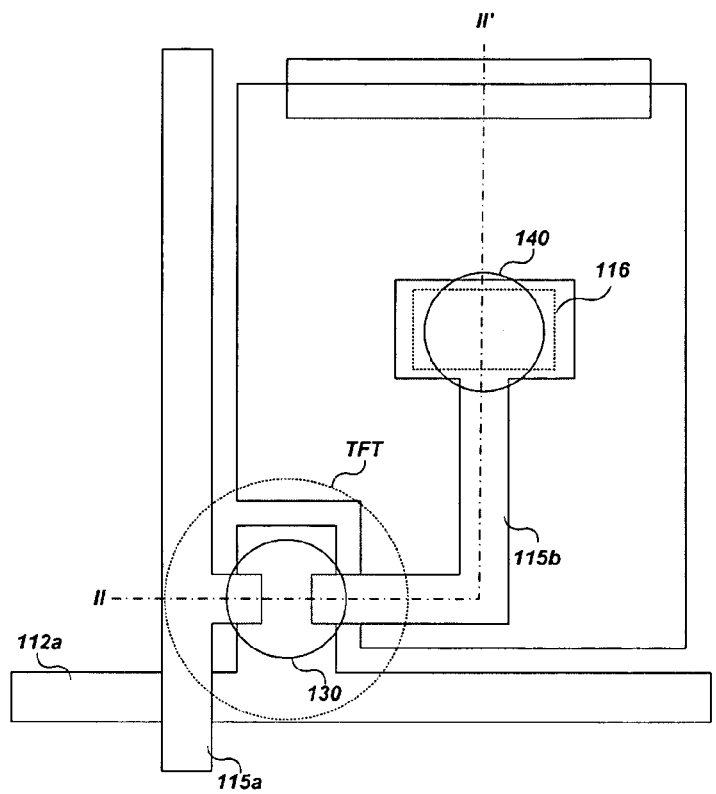
FIG. 3 is a schematic layout diagram showing the construction of a liquid crystal panel according to a first embodiment of the present invention.

FIG. 3 is a schematic layout diagram showing the construction of a liquid crystal panel according to a first embodiment of the present invention.

Referring to FIG. 3, the liquid crystal panel having a dual column spacer according to the first embodiment of the present invention includes a first column spacer 130 and a second column spacer 140. The first column spacer 130 is formed over a TFT formation region corresponding to a black matrix region of a color filter substrate. The second column spacer 140 is formed over a drain electrode 115b of a pixel region corresponding to a color filter region of the color filter substrate. The first column spacer 130 serves as a gap spacer for maintaining the gap between a TFT array substrate and the color filter substrate. The second column spacer 140 serves as a pressing spacer and is separated from the TFT array substrate by a predetermined distance.

The TFT is formed at the crossing of a gate line 112a and a data line 115a. The first column spacer 130 is formed over the TFT. A source electrode 115b of the TFT is connected to a pixel electrode 117 (in FIG. 4) in the pixel region by means of a contact hole. The second column spacer 140 is formed over the contact hole and can enter the contact hole when the liquid crystal panel is compressed by an external force.

Figure 4:
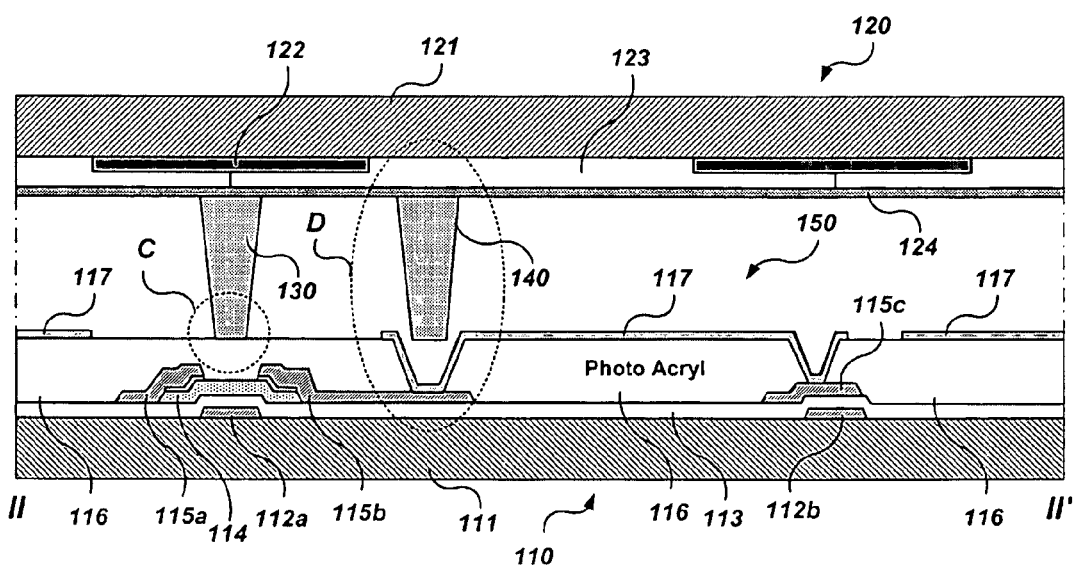
FIG. 4 is a cross-sectional view of the liquid crystal panel according to the first embodiment of the present invention.

FIG. 4 is a cross-sectional view of the liquid crystal panel according to the first embodiment of the present invention.

Referring to FIG. 4, the liquid crystal panel having dual column spacers according to the first embodiment of the present invention includes a TFT array substrate 110, a color filter substrate 120, a liquid crystal layer 150, the first column spacer 130, and the second column spacer 140.

In the TFT array substrate 110, a polished photo acryl layer 116 is formed on the entire surface of the pixel region including the TFT. The TFT array substrate 110 includes a contact hole for connecting the pixel electrode 117, which is partially formed on the photo acryl layer 116 to the drain electrode 115b of the TFT, which is formed below the photo acryl layer 116. The polished photo acryl layer 116 may have a thickness of approximately 1.5 μm to approximately 3.5 μm.

The contact hole for connecting the pixel electrode 117 to the drain electrode 115b is formed by etching the polished photo acryl layer 116.

Furthermore, the color filter substrate 120 is opposite to the TFT array substrate 110, and has a black matrix 122 and a color filter 123 formed thereon.

The liquid crystal layer 150 may be formed by injecting liquid crystal between the TFT array substrate 110 and the color filter substrate 120 or by forming the liquid crystal layer on one of the TFT array substrate 110 and the color filter substrate 120 before bonding the substrates 110 and 120.

The first column spacer 130 is formed on the color filter substrate 120 to touch the an upper layer of the TFT array substrate 110, such as the photo acryl layer 116 or an alignment layer and serves to maintain the gap between the TFT array substrate 110 and the color filter substrate 120.

The second column spacer 140 is formed on the color filter substrate 120 over the contact hole of the TFT array substrate 110 with a predetermined distance of separation between the second column spacer 130 and an upper layer of the TFT array substrate 110. The separation of the second columns spacer 140 and TFT array substrate 110 results from the depth of the contact hole and allows the allows the liquid crystal panel to deflect into the gap between substrates 110 and 120 by the amount of the predetermined distance as the second column spacer 130 moves into the contact hole.

The first column spacer 130 and the second column spacer 140 are formed to have the same height as measured from the color filter substrate 120 allowing the first and second column spacers to be formed using the same process.

The first column spacer 130 is formed between the TFT of the TFT array substrate 110 and the black matrix 122 of the color filter substrate 120. The second column spacer 140 is formed between the pixel electrode 117 of the TFT array substrate 110 and the color filter 123 of the color filter substrate 120.

Figure 5:
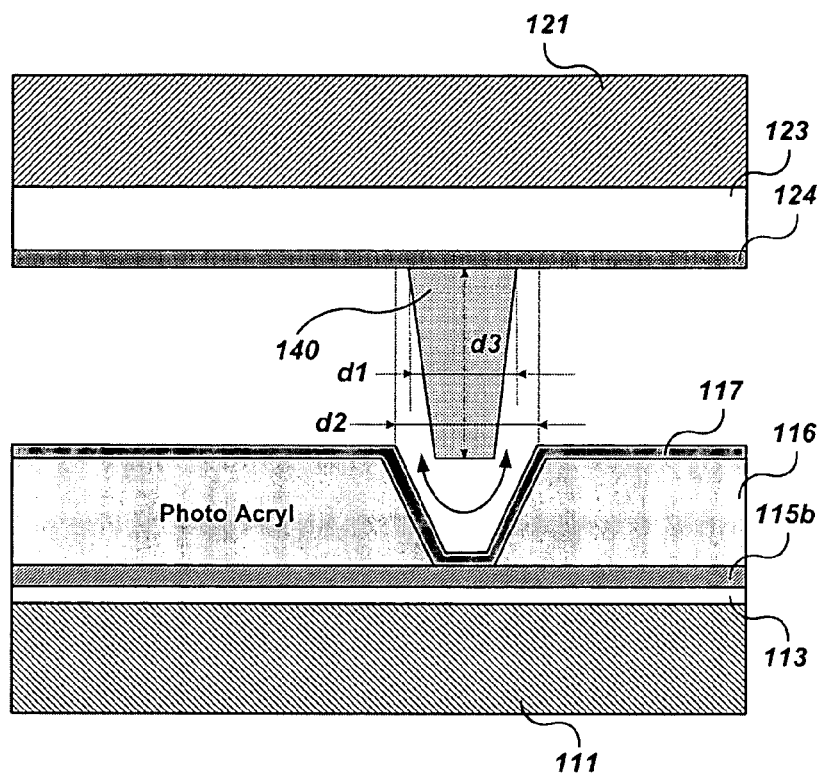
FIG. 5 is a detailed view illustrating the portion of a pressing column spacer shown in FIG. 4.

FIG. 5 is a detailed view illustrating the pressing column spacer shown in FIG. 4.

Referring to FIG. 5, the cross section of the opening portion of the contact hole is greater than that of the second column spacer 140 (i.e., the pressing column spacer). That is, a diameter d2 of the opening portion of the contact hole is formed to be greater than a diameter d1 of the second column spacer 140 so that the second column spacer 140 can enter the contact hole when pressure is applied to the liquid crystal display device.

Furthermore the contact hole is formed to have an etch depth smaller than a longitudinal length d3 of the second column spacer 140. Because the etch depth of the contact hole is set to be smaller than the longitudinal length d3 of the second column spacer 140 the second column spacer 140 does not completely enter the depressed depth of the contact hole when the liquid crystal display device is compressed.

The liquid crystal panel according to the first embodiment of the present invention uses the photo acryl layer 116 as the organic insulation film to increase the aperture ratio and provides improved resistance gravity failure, touch spots, pressing failure of the liquid crystal display device by employing a structure of dual column spacers 130 and 140.

A method of manufacturing a liquid display panel according to a first embodiment of the present invention will be described below with reference to FIGS. 6A to 6H.

FIGS. 6A to 6H illustrate a method of manufacturing the liquid display panel according to the first embodiment of the present invention.

Figure 6A:
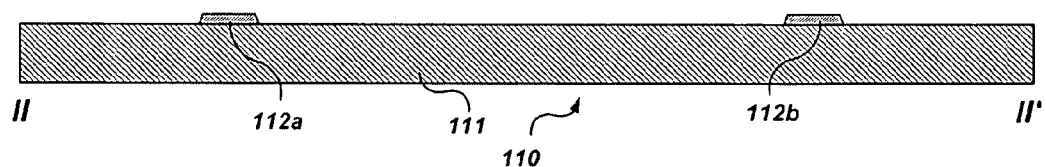
FIGS. 6A to 6H illustrate a method of manufacturing a liquid display panel according to a first embodiment of the present invention.

Referring first to FIG. 6A, a metal material, such as Mo, Al or Cr, is blanket deposited on a transparent glass substrate 111 by means of a sputtering method. The metal material is patterned through a first mask (not shown), forming gate electrodes 112a and 112b that project from one of the plurality of gate lines. In the liquid crystal display device of the IPS method, a common line (not shown) may be formed parallel to the gate lines in the same process and a common electrode (not shown) that projects in parallel or in zigzag patterns from the common line may be formed.

Figure 6B:
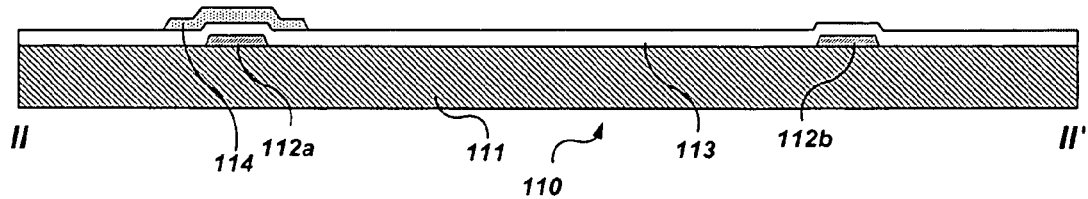

Referring to FIG. 6B, an insulating material, such as SiNx, is blanket deposited on the glass substrate 111 including the gate lines, thereby forming a gate insulating film 113. A semiconductor layer 114 is formed on the gate insulating film 113 to cover the gate electrodes 112a and 112b. The semiconductor layer 114 may be formed by consecutively depositing an amorphous silicon layer and a n+ layer into which phosphorous (P) is doped at a high concentration on the gate insulating film 113 and patterning the n+ layer and the amorphous silicon layer through a second mask (not shown) at the same time.

Figure 6C:
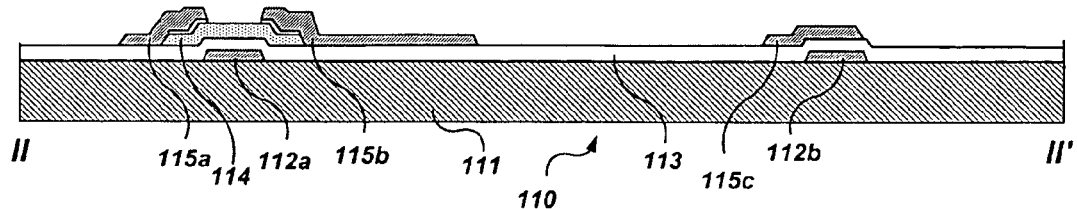

Referring to FIG. 6C, a metal material such as Mo, Al or Cr, is deposited on the entire surface by the sputtering method. The metal material is patterned using a third mask (not shown), thus forming a source electrode 115a and a drain electrode 115b at opposite sides of the gate electrode 112a. The source electrode 115a may be formed as a projection from the data line.

In the metal patterning process, over etching may be performed up to the n+ layer below the source electrode 115a and the drain electrode 115b to strip the n+ layer from a top surface of the gate electrode 112a. Accordingly, the amorphous silicon layer remains formed on the gate electrode 112a. The exposed portion of the gate electrode 112a is a region defined by the channel region of the TFT. The amorphous silicon layer and the n+ layer form the semiconductor layer 114. Furthermore, the drain electrode 115b extends into the pixel region corresponding to a color filter area of the color filter substrate.

Figure 6D:
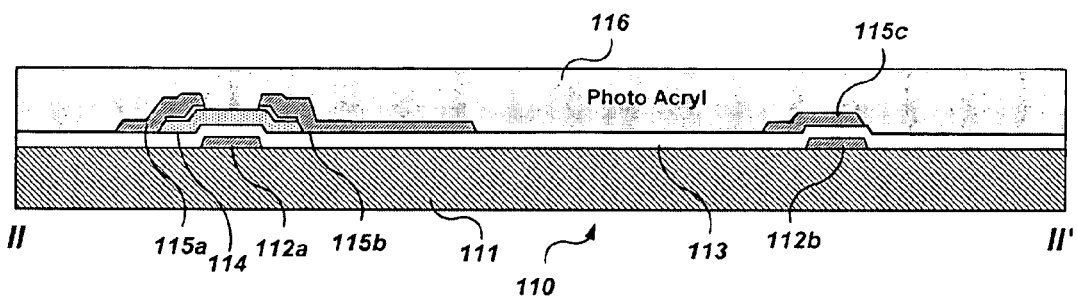

Referring to FIG. 6D, the photo acryl layer 116 (i.e., the organic insulation film) is blanket deposited on the gate insulating film 113 and is formed over the source electrode 115a, the drain electrode 115b, the semiconductor layer 114 and other components by means of Chemical Vapor Deposition (CVD). The photo acryl layer 116 is polished using Chemical Mechanical Polishing (CMP). The photo acryl layer 116 serving as a protection layer is formed using an organic material having a low dielectric constant thereby improving the aperture ratio of the liquid crystal panel.

Figure 6E:
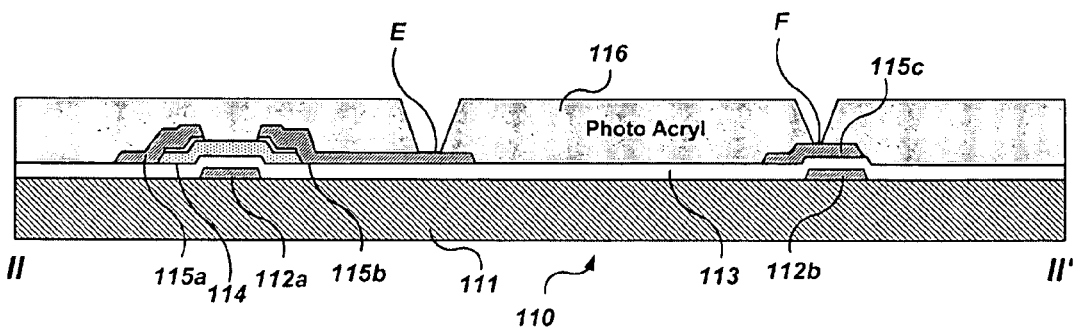

Referring to FIG. 6E, a portion of the protection layer 116 on the drain electrode 115b is selectively etched through a fourth mask (not shown) to form a contact hole exposing a portion of the drain electrode 115b. The cross section of the opening portion of the contact hole is formed to be larger than that of a second column spacer to be formed subsequently. Reference numeral "E" denotes a contact hole through which the drain electrode 115b is exposed and reference numeral "F" denotes a contact hole through which the metal electrode 115c of the capacitor region is exposed.

Figure 6F:
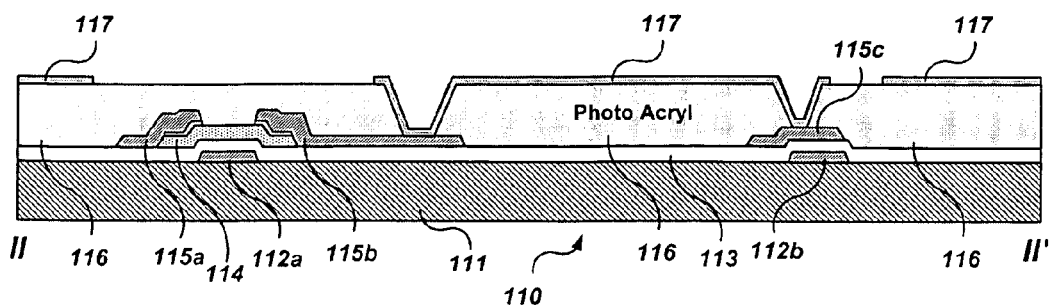

Referring to FIG. 6F, a transparent electrode material is deposited on the photo acryl layer 116 through a sputtering process so that the transparent electrode material fills a portion of the contact hole. The transparent electrode material is patterned through a fifth mask (not shown), thus forming the pixel electrode 117 of a parallel or zigzag pattern. The pixel electrode 117 is formed to alternate with the common electrode (not shown) within the pixel region.

When the TFT array substrate 110 is formed as described above, a portion at which the TFT will be formed and a portion of the pixel region corresponding to the color filter layer of the color filter substrate have the same step height.

Figure 6G:
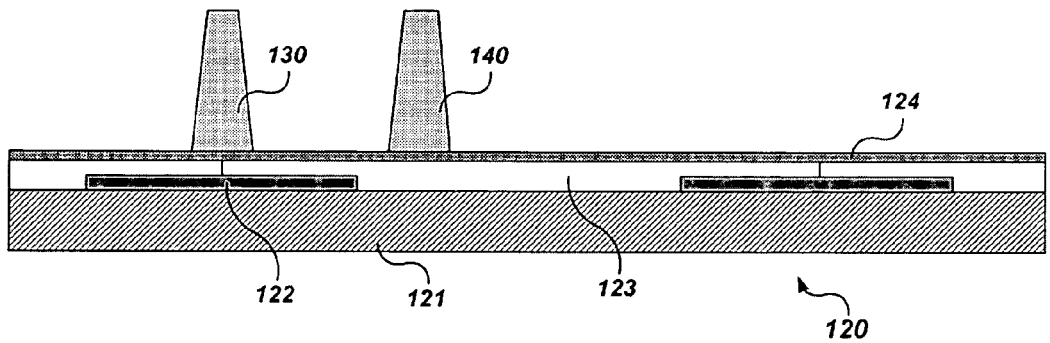

Referring to FIG. 6G, the black matrix layer 122 for shielding light from portions other than the pixel region, such as the gate line region, the data line region, and the TFT region, is formed on a transparent glass substrate 121. The R, G, and B color filter layers 123 for representing colors are formed in areas corresponding to the pixel regions. An overcoat layer 124 is formed on the entire surfaces of the black matrix layer 122 and the color filter layers 123. The first and second column spacers 130 and 140 having the same height are formed in portions of the color filter substrate corresponding to regions above the TFT region and the pixel electrode 117 of the TFT array substrate 110.

In the first embodiment of the present invention, the first column spacer 130 is formed at a location corresponding to a portion at which the TFT of the TFT array substrate 110 is formed. The second column spacer 140 is formed at a location corresponding to a portion at which the pixel region of the TFT array substrate 110 is formed.

As described above, after first and second orientation films (not shown) are formed on the TFT array substrate 110 in which each TFT array is formed, and the color filter substrate 120 in which the color filter array including the first and second column spacers 130 and 140 is formed, respectively, a rubbing process is carried out. The rubbing process refers to a process of establishing an initial orientation direction of liquid crystal by rubbing fabrics against the surfaces of the first and second orientation films at a constant pressure and speed so that polymer chains on the surfaces of the first and second orientation films are oriented in a constant direction.

Figure 6H:
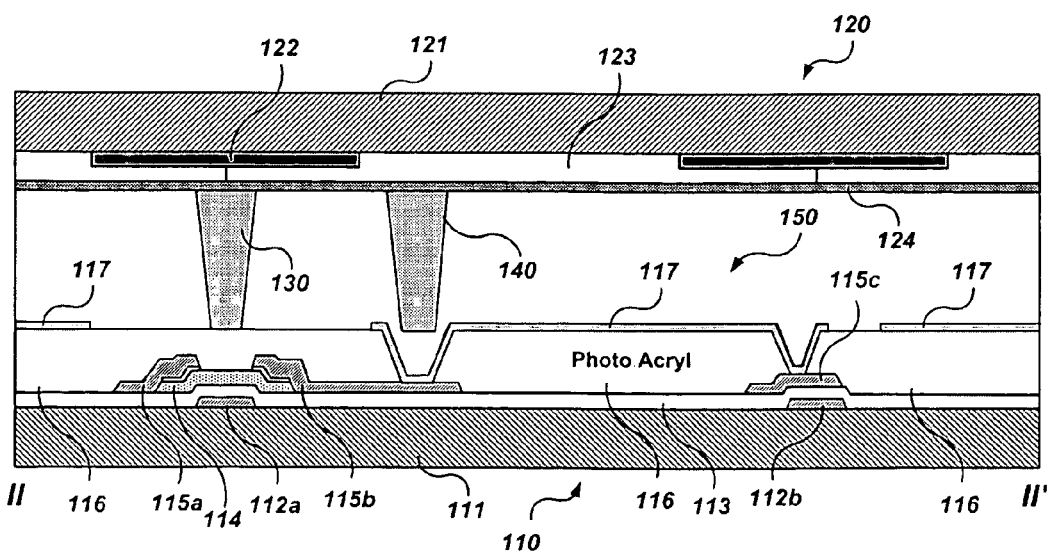

Referring to FIG. 6H, the TFT array substrate 110 and the color filter substrate 120 on which the orientation process has been performed are cleaned. Liquid crystal 150 is dropped on a predetermined region of one of the TFT array substrate 110 and the color filter substrate 120. The other of the TFT array substrate 110 and the color filter substrate 120, on which the liquid crystal has not been dropped, is reversed (turned over so that the other substrate is opposite to the one substrate). After the TFT array substrate 110 and the color filter substrate 120 are bonded together, the bonded substrates are cut into unit liquid crystal panels and processed. Manufacturing of the liquid crystal display panel is completed by inspecting the external appearance and checking for electrical failures of the processed unit liquid crystal panel.

Figure 7:
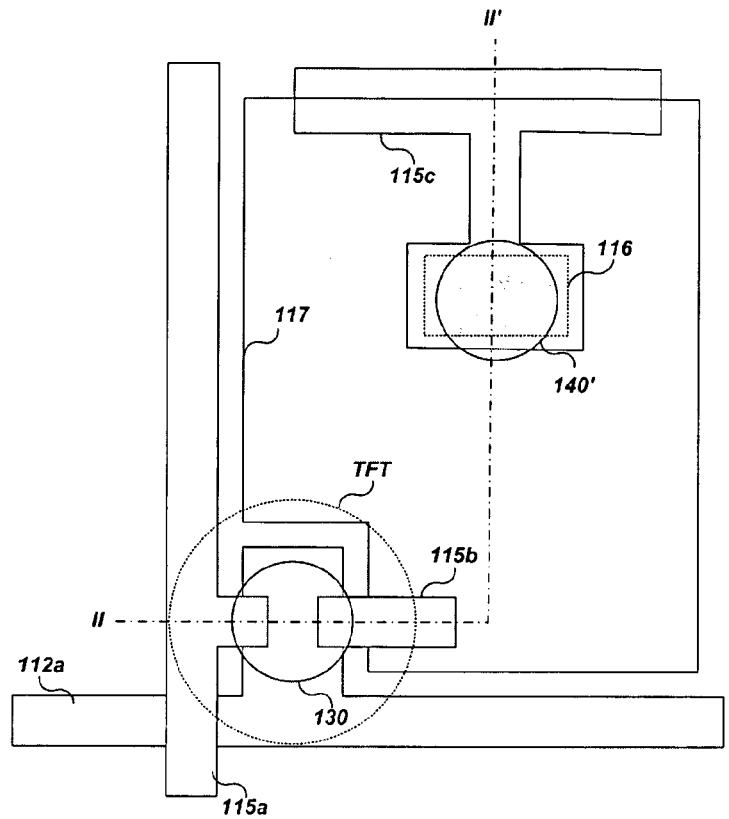
FIG. 7 is a schematic layout diagram of a liquid crystal panel according to a second embodiment of the present invention.

FIG. 7 is a schematic layout diagram of a liquid crystal panel according to a second embodiment of the present invention.

Referring to FIG. 7, the liquid crystal panel having a dual column spacer according to the second embodiment of the present invention includes a first column spacer 130 and a second column spacer 140'. The first column spacer 130 is formed on a TFT formation region corresponding to a black matrix region of a color filter substrate. The second column spacer 140' is formed over a charge capacitor of a pixel region corresponding to a color filter region of the color filter substrate. The first column spacer 130 serves as a gap spacer for maintaining the gap between a TFT array substrate and the color filter substrate. The second column spacer 140' serves as a pressing spacer that is spaced apart from the TFT array substrate at a predetermined distance.

Furthermore, a TFT is formed at the crossing of a gate line 112a and a data line 115a. The first column spacer 130 is formed on the TFT. A metal electrode 115c of the charge capacitor is connected to a pixel electrode 117 of a pixel region by means of a contact hole. The second column spacer 140' is formed over the contact hole.

Figure 8:
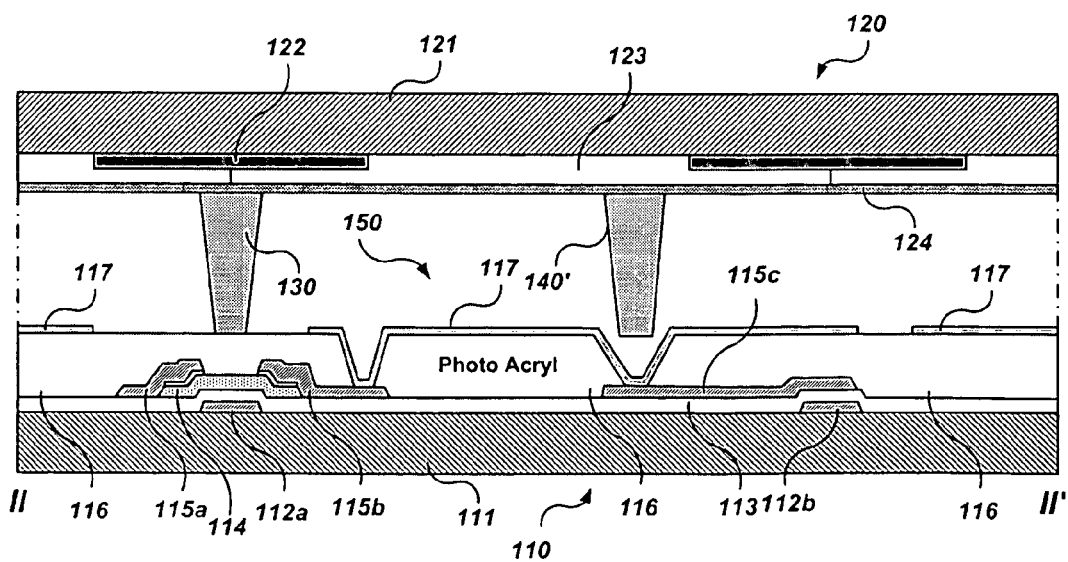
FIG. 8 is a cross-sectional view of the liquid crystal panel according to the second embodiment of the present invention.

FIG. 8 is a cross-sectional view of the liquid crystal panel according to the second embodiment of the present invention.

Referring to FIG. 8, the liquid crystal panel having the dual column spacer according to the second embodiment of the present invention includes a TFT array substrate 110, a color filter substrate 120, a liquid crystal layer 150, the first column spacer 130, and the second column spacer 140'.

In the TFT array substrate 110, a polished photo acryl layer 116 is formed on the entire surface of the pixel region including the TFT. The TFT array substrate 110 includes a contact hole for connecting the pixel electrode 117 partially formed on the photo acryl layer 116 to the metal electrode 115c of the capacitor formed below the photo acryl layer 116. The polished photo acryl layer 116 may be formed to a thickness of approximately 1.5 μm to approximately 3.5 μm.

The contact hole for connecting the pixel electrode 117 and the metal electrode 115c of the capacitor region is formed by etching the polished photo acryl layer 116.

Furthermore, a color filter substrate 120 is disposed opposite to the TFT array substrate 110 and has a black matrix 122 and a color filter 123 formed thereon.

The liquid crystal layer 150 is formed by injecting liquid crystal between the TFT array substrate 110 and the color filter substrate 120 or by forming liquid crystal on one of the TFT array substrate 110 and the color filter substrate 120 before bonding the substrates 110 and 120.

The first column spacer 130 is formed on the color filter substrate 120 to contact the TFT array substrate 110 and serves to maintain the gap between the TFT array substrate 110 and the color filter substrate 120.

The second column spacer 140' is formed on the color filter substrate 120 over the contact hole and is separated from the TFT array substrate 110 by a predetermined distance. The second column spacer 140' allows the liquid crystal panel to deflect by a distance equal to the predetermined separation distance. The cross section of the opening portion of the contact hole is set to be larger than a cross section of the second column spacer 140' to allow the column spacer to move into the contact hole in response to a pressure applied to the liquid crystal panel.

The first column spacer 130 and the second column spacer 140' are formed to have the same height measured from the color filter substrate 120.

Accordingly, the first column spacer 130 is formed between the TFT of the TFT array substrate 110 and the black matrix 122 of the color filter substrate 120. The second column spacer 140' is formed between the pixel electrode 117 of the TFT array substrate 110 and the color filter 123 of the color filter substrate 120.

As the method of manufacturing the liquid display panel having the dual column spacer according to a second embodiment of the present invention is the same as the method of manufacturing the liquid display panel having the dual column spacer according to the first embodiment except that the second column spacer 140' is formed over the metal electrode 115c of the capacitor region, a detailed description of the manufacturing process for the liquid crystal display panel according to the second embodiment will be omitted.

Furthermore, in the liquid crystal display device according to the embodiments of the present invention, the locations of the first and second column spacers 130 and 140 may be changed depending on the design of the TFT array substrate 100 (the TFT substrate). For example, the second column spacer may be positioned over a contact hole on the first substrate other than the contact hole for connecting the pixel and drain electrodes or for connecting the pixel and capacitor electrodes.

In accordance with the liquid crystal panel and the manufacturing method thereof described above according to the embodiments of the present invention, a liquid crystal panel of a new structure having the advantages of the photo acryl pixel structure and the advantages of the dual column spacer structure can be provided. Accordingly, the liquid crystal panel of the new structure can reduce the occurrence of gravity failure, touch spots, pressing (or painting) failure, and so on through the advantages of the dual column spacer structure while maintaining a high aperture ratio through the advantages of the photo acryl pixel structure.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal panel comprising:
   a first substrate on which a polished organic insulation film is formed on the entire surface of a pixel region including a TFT, the first substrate including a contact hole formed through the organic insulation film;
   a second substrate disposed opposite to the first substrate and having a black matrix and a color filter formed thereon;
   a liquid crystal layer formed between the first substrate and the second substrate;
   a first column spacer formed on the second substrate to contact the first substrate to maintain a gap between the first substrate and the second substrate; and
   a second column spacer formed on the second substrate on an area of the second substrate corresponding to the contact hole on the first substrate, wherein the second column spacer is formed on the second substrate to be non-overlapped with the black matrix and is formed to be separated from the first substrate by a predetermined distance.

2. The liquid crystal panel as claimed in claim 1, wherein the contact hole is formed to connect a pixel electrode partially formed on the organic insulation film to a drain electrode of the TFT formed below the organic insulation film.

3. The liquid crystal panel as claimed in claim 1, wherein the contact hole is formed to connect a pixel electrode partially formed on the organic insulation film to a metal electrode of a capacitor formed below the organic insulation film.

4. The liquid crystal panel as claimed in claim 1, wherein the polished organic insulation film is a photo acryl layer.

5. The liquid crystal panel as claimed in claim 1, wherein the polished organic insulation film is formed to have a thickness of approximately 1.5 μm to approximately 3.5 μn.

6. The liquid crystal panel as claimed in claim 1, wherein the first column spacer and the second column spacer are formed to have substantially the same height on the second substrate.

7. The liquid crystal panel as claimed in claim 1, wherein the contact hole in the organic insulation film is etched to form the contact hole.

8. The liquid crystal panel as claimed in claim 7, wherein an etch depth of the contact hole is formed to be smaller than a longitudinal length of the second column spacer.

9. The liquid crystal panel as claimed in claim 1, wherein a cross section of an opening portion of the contact hole is formed to be larger than a cross section of the second column spacer.

10. The liquid crystal panel as claimed in claim 1, wherein the first column spacer is formed between the TFT of the first substrate and the black matrix of the second substrate, and the second column spacer is formed between the pixel electrode of the first substrate and the color filter of the second substrate.

11. A method of manufacturing a liquid crystal panel comprising:
    preparing a first substrate on which a TFT array is formed;
    preparing a second substrate on which a black matrix and a color filter array are formed;
    forming an organic insulation film on the first substrate and polishing the organic insulation film;
    forming a pixel electrode partially on the polished organic insulator film;
    forming a contact hole through the organic insulation film;
    forming a first column spacer on the first substrate to contact the second substrate to maintain a gap between the first substrate and the second substrate;
    forming a second column spacer on the second substrate on an area of the second substrate corresponding to the contact hole, wherein the second column spacer, wherein the second column spacer is formed on the second substrate to be non-overlapped with the black matrix and is separated by a predetermined distance from the first substrate; and
    forming a liquid crystal layer between the first and second substrates.

12. The method as claimed in claim 11, wherein forming a contact hole on the organic layer includes forming a contact hole to connect the pixel electrode to a drain electrode of a TFT formed below the organic insulation film.

13. The method as claimed in claim 12, wherein forming a contact hole on the organic layer includes etching the polished organic insulation film to form the contact hole to expose the drain electrode of the TFT.

14. The method as claimed in claim 11, wherein the first substrate includes a capacitor formed below the organic insulation film, and wherein forming a contact hole on the organic layer includes forming a contact hole to connect a pixel electrode formed partially on the polished organic insulation film to a metal electrode of the capacitor.

15. The method as claimed in claim 14, wherein forming a contact hole includes etching the polished organic insulation film to expose the metal electrode of the capacitor.

16. The method as claimed in claim 11, wherein the organic insulation film is a photo acryl layer.

17. The method as claimed in claim 11, wherein forming an organic insulation film on the first substrate and polishing the organic insulation film includes forming the organic insulation film to a thickness of approximately 1.5 μm to approximately 3.5 μm.

18. The method as claimed in claim 11, wherein forming a contact hole includes forming a cross section of an opening portion of the contact hole to be larger than a cross section of the second column spacer.

19. The method as claimed in claim 11, wherein forming a contact hole includes forming the contact hole to have an etch depth smaller than a longitudinal length of the second column spacer.

20. The method as claimed in claim 11, wherein forming a first column spacer includes forming the first column spacer to be between the TFT of the first substrate and the black matrix of the second substrate, and wherein forming a second column spacer includes formed the second column spacer between the pixel electrode of the first substrate and the color filter of the second substrate.

21. The method as claimed in claim 11, wherein forming a second column spacer includes forming the second column spacer to have substantially the same height on the second substrate as the first column spacer.

* * * * *